US012198521B2

(12) United States Patent
Baik

(10) Patent No.: US 12,198,521 B2
(45) Date of Patent: Jan. 14, 2025

(54) INDIVIDUAL DANGEROUS STATE DETECTION-BASED SITUATION INFORMATION ACQUISITION DEVICE

(71) Applicant: Woomin Baik, Hwaseong-si (KR)

(72) Inventor: Woomin Baik, Hwaseong-si (KR)

( * ) Notice: Subject to any disclaimer, the term of this patent is extended or adjusted under 35 U.S.C. 154(b) by 220 days.

(21) Appl. No.: 18/004,208

(22) PCT Filed: Jun. 24, 2021

(86) PCT No.: PCT/KR2021/007941
§ 371 (c)(1),
(2) Date: Jan. 4, 2023

(87) PCT Pub. No.: WO2022/039373
PCT Pub. Date: Feb. 24, 2022

(65) Prior Publication Data

US 2023/0267816 A1 Aug. 24, 2023

(30) Foreign Application Priority Data

Aug. 19, 2020 (KR) ........................ 10-2020-0104013

(51) Int. Cl.

| | |
|---|---|
| ***H04M 11/04*** | (2006.01) |
| ***G08B 21/02*** | (2006.01) |
| ***G08B 25/01*** | (2006.01) |
| ***G08B 25/14*** | (2006.01) |
| *G08B 13/16* | (2006.01) |

(52) U.S. Cl.
CPC ........... *G08B 21/02* (2013.01); *G08B 25/012* (2013.01); *G08B 25/14* (2013.01); *G08B 13/1672* (2013.01)

(58) Field of Classification Search
CPC ....... G08B 21/02; G08B 25/012; G08B 25/14
See application file for complete search history.

(56) References Cited

U.S. PATENT DOCUMENTS

| | | | | |
|---|---|---|---|---|
| 2012/0053472 | A1* | 3/2012 | Tran | G01S 5/10 600/509 |
| 2016/0140828 | A1* | 5/2016 | DeForest | A61B 5/024 340/539.12 |
| 2019/0206230 | A1* | 7/2019 | Musumano | H04W 4/90 |

(Continued)

FOREIGN PATENT DOCUMENTS

| | | |
|---|---|---|
| KR | 10-1529462 B1 | 6/2015 |
| KR | 10-2016-0095788 A | 8/2016 |

(Continued)

*Primary Examiner* — Simon King
(74) *Attorney, Agent, or Firm* — KORUS Patent, LLC; Seong Il Jeong

(57) ABSTRACT

According to various embodiments of the present invention, an individual's dangerous state detection-based situation information acquisition device may include: a sensor unit configured to detect an individual's state; a control unit configured to determine that the individual's state is a dangerous state when the rate of change of the maximum value of a sensor data stream detected by the sensor unit satisfies Equation 1 below; a camera configured to photograph the surroundings of the situation information acquisition device from the time when it is determined that the individual's state is a dangerous state; and a voice recorder configured to record sounds generated in the surroundings. Other embodiments may also be possible.

10 Claims, 2 Drawing Sheets

(56) References Cited

U.S. PATENT DOCUMENTS

| | | | | |
|---|---|---|---|---|
| 2020/0359605 | A1* | 11/2020 | Maher | A01K 27/009 |
| 2024/0280988 | A1* | 8/2024 | Dean | G05D 1/0255 |

FOREIGN PATENT DOCUMENTS

| | | | |
|---|---|---|---|
| KR | 10-1654708 | B1 | 9/2016 |
| KR | 10-2019-0082692 | A | 7/2019 |
| KR | 10-2019-0105163 | A | 9/2019 |

* cited by examiner

INDIVIDUAL DANGEROUS STATE DETECTION-BASED SITUATION INFORMATION ACQUISITION DEVICE

TECHNICAL FIELD

The present invention relates to an individual's dangerous state detection-based situation info lotion acquisition device, and more particularly, to a device that can photograph an image for an emergency or conflict situation that may occur during an individual's life and transmit location information and a surrounding image to an administrator having the legal authority to store the data in real time.

BACKGROUND ART

Recently, as electronic devices such as smartphones and wearable devices have gradually developed, related technologies for checking an individual's state have increased. Most of these related technologies are limited to assistance with the health and lifestyle of individuals using electronic devices.

Meanwhile, individuals using electronic devices may encounter conflict situations, dangerous situations, or legal disputes that may occur in social activities and various relationships. For example, in everyday life, when users encounter dangerous opponents such as robbers, kidnappers, or sexual assaulters in back alleys or places where people are rare, the individuals scream for help or request for help through electronic devices in most cases. In many cases, it is difficult to scream or use electronic devices in an emergency, so that it is difficult to request rescue rapidly.

Therefore, there is a demand for technology in which, when an individual becomes unable to respond to an emergency situation as described above or when a conflict situation, a dangerous situation, or a legal dispute is expected, the situation is photographed and recorded in real time and an image is transmitted to an administrator having legal authority, thereby enabling the administrator to rapidly respond to an emergency in order to ensure the safety of a victim and allowing related data to be easily acquired.

(Patent document 1) Korean Patent Application Publication No. 10-2020-0002542

DISCLOSURE

Technical Problem

The present invention has been conceived to overcome the above-described problems, and an object of the present invention is to provide a device that can accurately measure an individual's dangerous state, thereby acquiring situation information in real time in the situation in which a danger occurs and transmitting it to an administrator device.

Technical Solution

According to various embodiments of the present invention, an individual's dangerous state detection-based situation information acquisition device may include: a sensor unit configured to detect an individual's state; a control unit configured to determine that the individual's state is a dangerous state when the rate of change of the maximum value of a sensor data stream detected by the sensor unit satisfies Equation 1 below; a camera configured to photograph the surroundings of the situation information acquisition device from the time when it is determined that the individual's state is a dangerous state; and a voice recorder configured to record sounds generated in the surroundings.

Advantageous Effects

According to the present invention described above, it has various effects as follows:

According to the present invention, a sensor data stream may be precisely analyzed, thereby rapidly recognizing an individual's dangerous situation, effectively recognizing a conflict situation occurring in the individual's social life, and rapidly securing a data image, a transcript and location information for the dangerous or conflict situation.

In addition, according to the present invention, whether an individual's state is a dangerous state may be accurately determined by analyzing a sensor data stream according to Equations 1 to 6.

MODE FOR INVENTION

Figure 1:
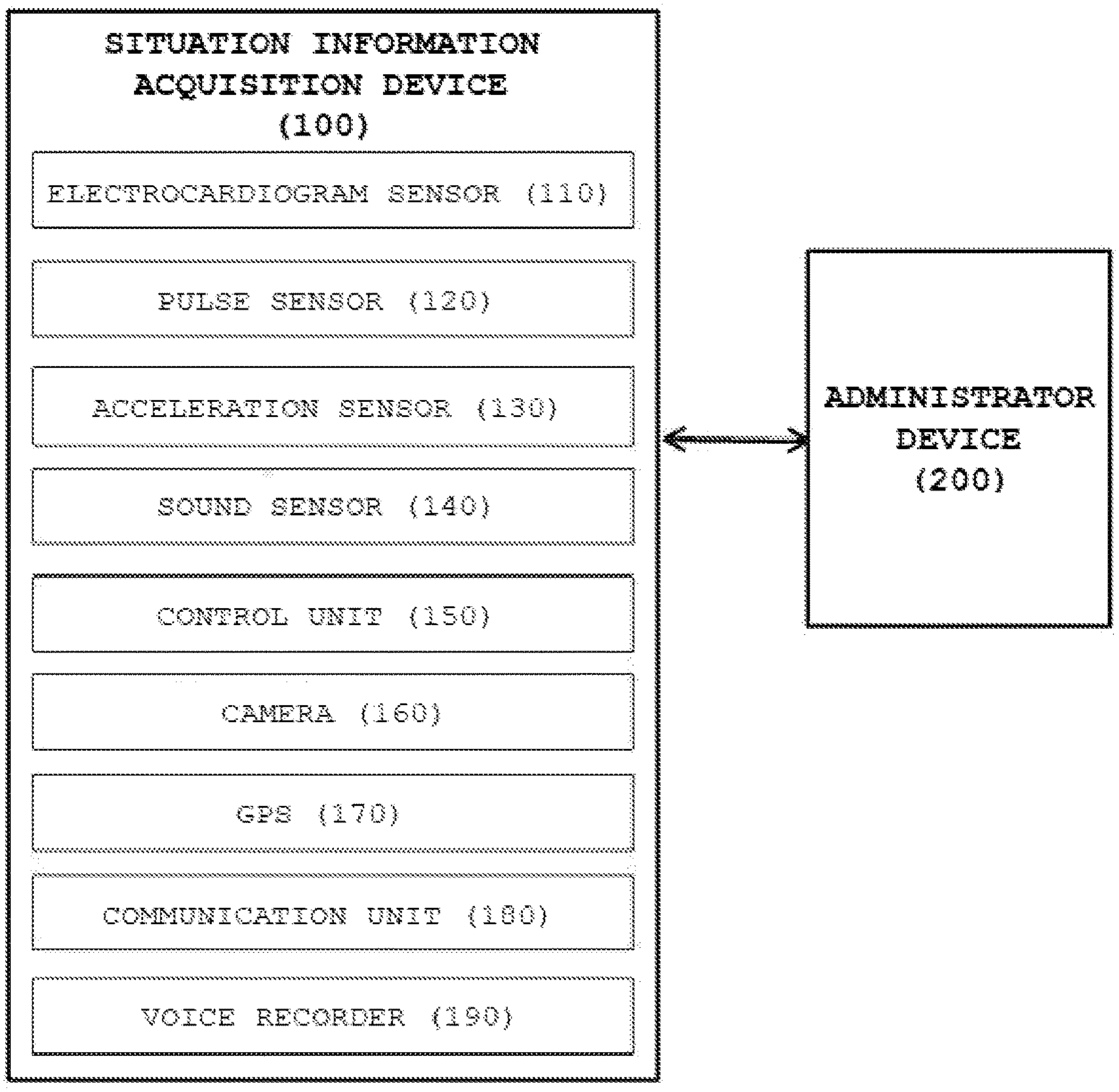
FIG. 1 is a block diagram showing a situation information acquisition device and an administrator device according to an embodiment of the present invention.

Various embodiments of the present invention will be described in detail below with reference to the accompanying drawings. Furthermore, in the description of the embodiments of the present invention, when it is determined that a detailed description of a related known function or configuration may unnecessarily obscure the subject matter of the present invention, the detailed description will be omitted. Furthermore, terms to be described later are terms defined by taking into consideration the functionality of the present invention, which may vary according to the intention of a user or operator, custom or the like. Accordingly, such definitions should be made based on the context throughout the present specification.

Preferred embodiments of the present invention will be described below with reference to the accompanying drawings. However, the present invention is not limited to the embodiments disclosed below, and may be implemented in various different forms. However, the present embodiments are provided merely to make the disclosure of the present invention complete and to fully convey the scope of the invention to those of ordinary skill in the art.

Various embodiments of the present document may be implemented as software (e.g., programs) including instructions stored in storage media readable by a machine (e.g., a computer). The machine is a device capable of invoking stored instructions from a storage medium and operating according to the invoked instructions, and may include an electronic device (e.g., a server) according to the disclosed embodiments. The instructions may include code that is generated or executed by a compiler or interpreter. The storage media readable by a machine may be provided in the form of non-transitory storage media. In this case, 'non-temporary' only means that the storage media does not contain a signal and is tangible, but does not distinguish whether data is stored semi-permanently or temporarily in the storage media.

According to an embodiment, a method according to each of various embodiments disclosed in this document may be included and provided in a computer program product. The computer program product may be traded between a seller and a buyer as a commodity. The computer program product may be distributed in the form of a machine-readable storage medium (e.g., compact disc-read only memory (CD-ROM)) or online through an application store (e.g., Play Store™). In the case of online distribution, at least part of the computer program product may be temporarily stored or generated in a storage medium such as memory of a manufacturer's server, an application store's server, or a relay server.

Each component (e.g., a module or program) according to various embodiments may be composed of a single entity or a plurality of entities. Some of the sub-components may be omitted or other sub-components may be further included in various embodiments. Alternatively or additionally, some components (e.g., modules or programs) may be integrated into one entity and perform the same or similar functions performed by the respective corresponding components prior to the integration. According to various embodiments, operations performed by modules, programs, or other components may be performed sequentially, in parallel, iteratively, or heuristically, at least some operations may be executed in a different sequence or omitted, or other operations may be added.

Unless otherwise defined, all the tams (including technical and scientific terms) used herein may be used to have meanings commonly understood by those of ordinary skill in the art to which the present invention pertains. In addition, the terms defined in commonly used dictionaries are not interpreted ideally or excessively unless explicitly specifically defined.

The terminology used herein is intended to describe the embodiments, and is not intended to limit the present invention. In this specification, singular forms also include plural fans unless specifically stated otherwise in phrases. As used herein, "comprises" and/or "comprising" do not exclude the presence or addition of one or more other elements other than recited elements.

FIG. 1 is a block diagram showing a situation information acquisition device and an administrator device according to an embodiment of the present invention.

Referring to FIG. 1, a situation information acquisition device 100 according to an embodiment of the present invention may constantly monitor an individual's dangerous state in real time, may determine whether an individual's state is a dangerous state by analyzing a sensor data stream collected through a sensor unit, and may transmit situation information (e.g., location information, a surrounding image, and a transcript) acquired in the state in which the individual's state is dangerous to an administrator device 200 when a designated condition is satisfied.

In an embodiment, the situation information acquisition device 100 may determine whether an individual's state is a dangerous state by analyzing a sensor data stream using Equations 1 to 6. For example, the dangerous state may include a personal danger situation (crime), a social disaster danger situation, and a conflict situation (in a personal relationship aspect, a social activity aspect, etc.). More details using the equations will be described later.

Accordingly, the situation information acquisition device 100 may acquire location information, a transcript, and surrounding image data when an individual's state is a dangerous state, thereby promoting rapid rescue in a dangerous situation and acquiring response data in a conflict situation. In other words, after recognizing the dangerous situation, the situation information acquisition device 100 may transmit current location information, an image, and a transcript (e.g., a voice recording) to an administrator (or a person authorized to hold video, and/or the like), may recognize a conflict situation, transcribe and record the situation, and transmit the image, transcript and location information to the administrator, and may rapidly recognize a dangerous situation, and rapidly transmit information for the securement of the safety of a victim and also store the information so that it can be used as necessary data when a conflict situation occurs.

In an embodiment, the situation information acquisition device 100 may include: a sensor unit configured to detect an individual's state; a control unit 150 configured to determine that the individual's state is a dangerous state when the rate of change of the maximum value of a sensor data stream detected by the sensor unit satisfies Equation 1; a camera 160 configured to, when it is determined that the individual's state is a dangerous state, photograph the surroundings of the situation information acquisition device from the time when it is determined that the individual's state is a dangerous state; a GPS 170 configured to acquire location information in real time; a communication unit 180 configured to transmit situation information to the administrator device 200; and a voice recorder 190 configured to record sounds generated around the situation information acquisition device.

For example, the situation information acquisition device 100 and the administrator device 200 may be connected to each other over a network. The network may include a wireless network and a wired network. For example, the network may be a short-distance communication network (e.g., a Bluetooth, Wi-Fi direct, or infrared data association (IrDA) network) or a long-distance communication network (e.g., a cellular network, the Internet, or a computer network (e.g., a LAN or WAN)).

In an embodiment, the situation information acquisition device 100 may be an electronic device that may be carried by an individual in a dangerous situation. For example, the situation information acquisition device 100 may include a smartphone, a tablet personal computer (a tablet PC), a mobile phone, a video phone, an e-book reader, a netbook computer, a personal digital assistant (PDA), a portable multimedia player (PMP), an MP3 player, a mobile medical device, a camera, or a wearable device.

In an embodiment, the sensor unit may include an electrocardiogram sensor 110 configured to measure an individual's electrocardiogram signal, a pulse sensor 120 configured to measure the individual's pulses, an acceleration sensor 130 configured to measure acceleration according to the individual's movement, and a sound sensor 140 configured to detect sounds around the situation information acquisition device. The sensors may be famed of respective well-known components. The sensor unit may acquire a sensor data stream related to an individual's state. For example, the sensor data stream may be a sensor data set over time.

In an embodiment, the administrator device 200 is a device (e.g., a server) used by an administrator, and the administrator may be a person authorized to use an image for the individual, a law enforcement organization such as the police, or a medical/relief organization.

Figure 2:
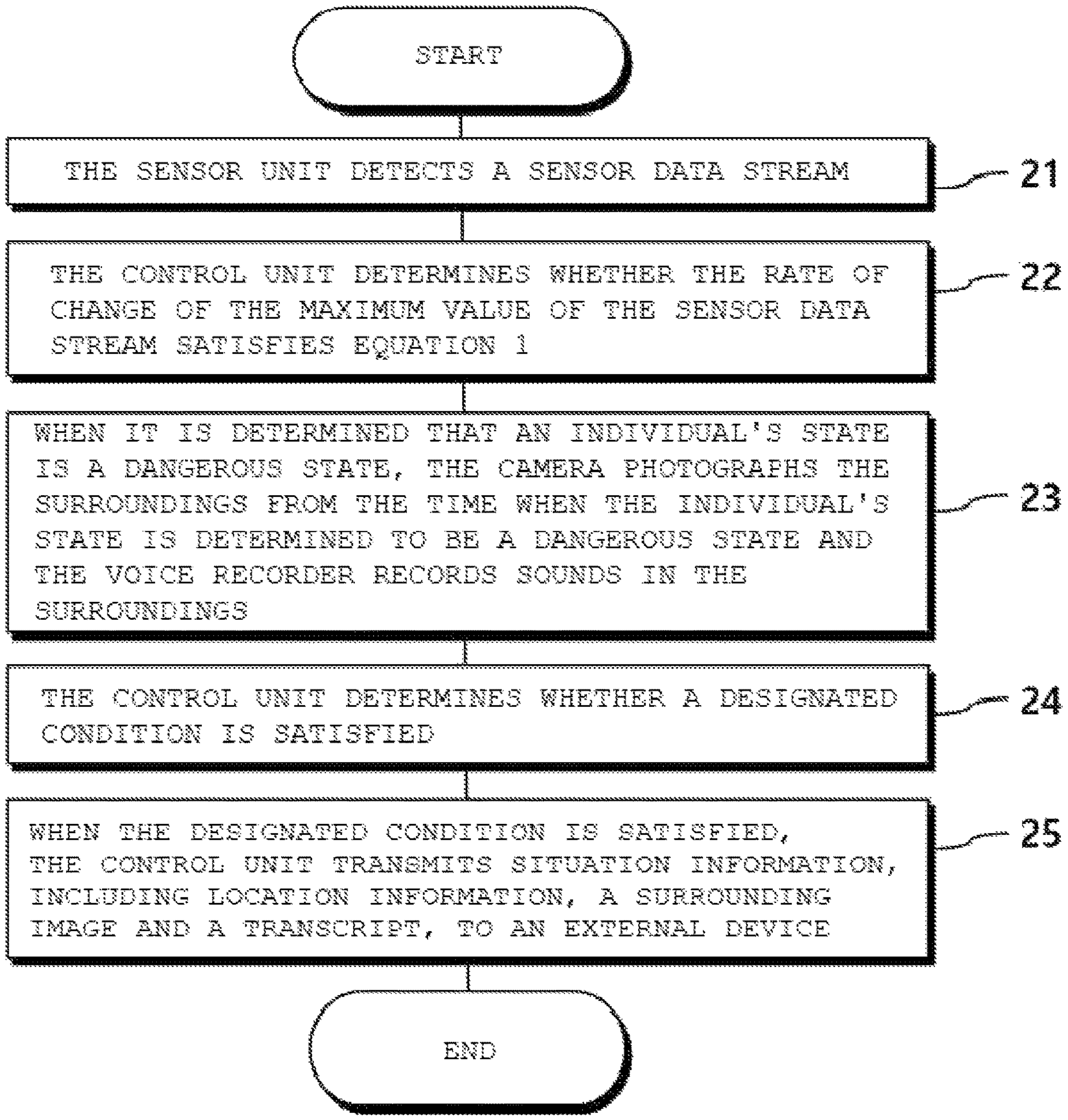
FIG. 2 is a flowchart showing a situation information acquisition method according to an embodiment of the present invention.

FIG. 2 is a flowchart showing a situation information acquisition method according to an embodiment of the present invention. The operations of FIG. 2 may be performed by the situation info lotion acquisition device 100 shown in FIG. 1.

Referring to FIG. 2, in an embodiment, the sensor unit may detect a sensor data stream in operation 21. For example, the sensor data stream includes an electrocardiogram data stream, a pulse rate data stream, an acceleration data stream, and a sound data stream, and may be represented by Equation 2 below. For example, the sensor data stream may include $(t_{n+1})\times 4$ pieces of data.

$$DS=\{H_e(t_0), \ldots ,H_e(t_n),H_b(t_0), \ldots H_b(t_n), G(t_0), \ldots ,G(t_n)S_s(t_0), \ldots S_s(t_n)\} \quad (2)$$

where $H_e(t_n)$ is the electrocardiogram data stream, $H_b(t_n)$ is the pulse rate data stream, $G(t_n)$ is the acceleration data stream, and $S(t_n)$ is the sound data stream.

In an embodiment, in operation 22, the control unit 150 may determine whether the rate of change of the maximum value of a sensor data stream detected by the sensor unit satisfies Equation 1 below. First, the maximum value of the sensor data stream may be represented by Equation 7 below.

$$\mathrm{Max}DS(t) = \max\left(DS(t_0)\sim DS(t_n)\right), \quad (7)$$

$$mDS = \left(DS(t_0)\sim dS(t_n)\right)/(n+1)$$

$$\mathrm{Max}H_e = \max\left(H_e(t_0)\sim H_e(t_n)\right),$$

$$mH_e = \left(H_e(t_0)\sim H_e(t_n)\right)/(n+1)$$

$$\mathrm{Max}H_b = \max\left(H_b(t_0)\sim H_b(t_n)\right),$$

$$mH_e = \left(H_e(t_0)\sim H_e(t_n)\right)/(n+1)$$

$$\mathrm{Max}G = \max\left(G(t_0)\sim G(t_n)\right),$$

$$mG = \left(G(t_0)\sim G(t_n)\right)/(n+1)$$

$$\mathrm{Max}S_s = \max\left(S_s(t_0)\sim S_s(t_n)\right),$$

$$mS_s = \left(S_s(t_0)\sim S_s(t_n)\right)/(n+1)$$

$$\left|\frac{d\mathrm{Max}DS(t)}{dt}\right| > 0.7mDS(t) \quad (1)$$

where DS(t) is the sensor data stream, MaxDS(t) is the maximum value of the sensor data stream, and mDS(t) is the average value of the sensor data stream.

For example, when the rate of change of the maximum value of the sensor data stream exceeds 70% of the average value measured in daily life, the control unit 150 may determine that the individual's state is a dangerous state. In this case, the average value of the sensor data stream denotes the value measured when an individual leads a daily life without being in danger. As a result of analyzing sensor data when an individual is in a dangerous state, it is confirmed that the individual enters a dangerous state when the change rate of the maximum value increases to 70% or more of the average value. Accordingly, when the rate of change of the maximum value of the sensor data stream increases to 70% or more of the average value, the control unit 150 may determine that the individual is in a dangerous state.

In an embodiment, in operation 23, when the control unit 150 determines that the individual's state is a dangerous state because it is confirmed that the rate of change of the maximum value of the sensor data stream satisfies Equation 1, the camera 160 may photograph the surroundings of the situation information acquisition device 100 from the time when it is determined that the individual's state is a dangerous state, and the voice recorder 190 may record surrounding sounds. In other words, when the individual falls into an emergency and needs a rescue request or when a conflict situation occurs, a surrounding image and a transcript may be important data for rescuing the individual or resolving a conflict. Accordingly, when determining that the individual is in a dangerous state, the situation information acquisition device 100 may acquire a surrounding image corresponding to relevant data via the camera 160 and may acquire a transcript via the voice recorder 190.

In an embodiment, the control unit 150 may determine whether a designated condition is satisfied in operation 24. Even when the individual is determined to be in a dangerous state and thus a surrounding image and a transcript are acquired, it may be more efficient to assign a designated condition rather than directly transmitting all a surrounding image and a transcript to the administrator device 200 in real time, and thus a designated condition for generating the event of transmitting a surrounding image may be additionally set.

Meanwhile, operation 24 may be omitted. Even in operation 25, all a surrounding image and a transcript may be transmitted to the administrator device 200 in real time and stored without a designated condition.

In an embodiment, the designated condition may include six examples to be described below.

For example, a first designated condition may correspond to a preset time or cycle. In other words, rather than transmitting all a surrounding image and a transcript, a transmission time or cycle may be limited to once a day or early morning. Accordingly, whenever a surrounding image and a transcript taken according to a preset time or cycle are acquired, the control unit 150 may transmit situation information including the location information of the situation info lotion acquisition device 100, the surrounding image, and the transcript to a designated external device (e.g., the administrator device 200).

First, the following operations of the control unit 150 will be described prior to describing second to sixth designated conditions. For example, the control unit 150 may determine whether the rate of change of the maximum value of the electrocardiogram data stream, the rate of change of the maximum value of the pulse rate data stream, the rate of change of the maximum value of the acceleration data stream, and the rate of change of the maximum value of the sound data stream satisfy the following Equations 3, 4, 5, and 6, respectively. The determination operation may be data for the determination of whether the second to fourth designated conditions are satisfied.

$$\left|\frac{d\mathrm{Max}H_e(t)}{dt}\right| > 0.7mH_e(t) \quad (3)$$

$$\left|\frac{d\mathrm{Max}H_b(t)}{dt}\right| > 0.7mH_b(t) \quad (4)$$

$$\left|\frac{d\mathrm{Max}G(t)}{dt}\right| > 0.7mG(t) \quad (5)$$

$$\left|\frac{d\mathrm{Max}S_s(t)}{dt}\right| > 0.7mS_s(t) \quad (6)$$

where $H_e(t)$ is the electrocardiogram data stream, $\mathrm{Max}H_e(t)$ is the maximum value of the electrocardiogram data stream, $mH_e(t)$ is the average value of the electrocardiogram data stream, $H_b(t)$ is the pulse rate data stream, $\mathrm{Max}H_b(t)$ is the maximum value of the pulse rate data stream, $mH_b(t)$ is the average value of the pulse rate data stream, G(t) is the acceleration data stream, MaxG(t) is the maximum value of the acceleration data stream, mG(t) is the average value of the acceleration data stream, S(t) is the sound data stream, MaxS(t) is the maximum value of the sound data stream, and mS(t) is the average value of the sound data stream.

For example, the second designated condition corresponds to a case in which the rate of change of the maximum value of the acceleration data stream increases to 70% or more of the average value while the rate of change of the maximum value of the electrocardiogram data stream increases to 70% or more of the average value. In other words, when the rate of change of the maximum value of the electrocardiogram data stream satisfies Equation 3 above and the rate of change of the maximum value of the acceleration data stream satisfies Equation 5, the control unit 150 may transmit situation information, including the location information of the situation information acquisition device 100, a taken surrounding image, and a transcript, to a designated external device (e.g., the administrator device 200).

In other words, when both the rate of change of the maximum value of the heart rate data stream and the rate of change of the maximum value of the acceleration data stream are each higher than 70% of the average value, it may be a case in which the possibility that the individual is in a dangerous state is high, so that the control unit 150 may immediately transmit situation information to the administrator device 200.

For example, the third designated condition corresponds to a case in which the rate of change of the maximum value of the acceleration data stream increases to 70% or more of the average value while the rate of change of the maximum value of the pulse rate data stream increases to 70% or more of the average value. In other words, when the rate of change of the maximum value of the pulse rate data stream satisfies Equation 4 above and the rate of change of the maximum value of the acceleration data stream satisfies Equation 5 above, the control unit 150 may transmit situation information, including the location information of the situation information acquisition device 100, a taken surrounding image, and a transcript, to a designated external device (e.g., the administrator device 200).

In other words, when both the rate of change of the maximum value of the pulse rate data stream and the rate of change of the maximum value of the acceleration data stream are each higher than 70% of the average value, it may be a case in which the possibility that the individual is in a dangerous state is high, so that the control unit 150 may immediately transmit situation information to the administrator device 200.

For example, the fourth designated condition corresponds to a case in which the rate of change of the maximum value of the electrocardiogram data stream increases to 70% or more of the average value, the rate of change of the maximum value of the acceleration data stream increases to 70% or more of the average value, and the rate of change of the maximum value of the sound data stream increases to 70% or more of the average value. In other words, when the rate of change of the maximum value of the electrocardiogram data stream, the rate of change of the maximum value of the acceleration data stream, and the rate of change of the maximum value of the sound data stream satisfy Equations 3, 5, and 6, respectively, the control unit 150 may transmit situation information, including the location information of the situation information acquisition device 100, a taken surrounding image, and a transcript, to a designated external device (e.g., the administrator device 200).

In other words, when all the rate of change of the maximum value of the heart rate data stream, the rate of change of the maximum value of the acceleration data stream, and the rate of change of the sound data stream are each higher than 70% of the average value, it may be a case in which the possibility that the individual is in a dangerous state is high, so that the control unit 150 may immediately transmit situation information to the administrator device 200.

For example, the fifth designated condition corresponds to a case in which the rate of change of the maximum value of the pulse rate data stream increases to 70% or more of the average value, the rate of change of the maximum value of the acceleration data stream increases to 70% or more of the average value, and the rate of change of the maximum value of the sound data stream increases to 70% or more of the average value. In other words, when the rate of change of the maximum value of the pulse rate data stream, the rate of change of the maximum value of the acceleration data stream, and the rate of change of the maximum value of the sound data stream satisfy Equations 4, 5, and 6, respectively, the control unit 150 may transmit situation information, including the location information of the situation information acquisition device 100, a taken surrounding image, and a transcript, to a designated external device (e.g., the administrator device 200).

In other words, when all the rate of change of the maximum value of the pulse rate data stream, the rate of change of the maximum value of the acceleration data stream, and the rate of change of the maximum value of the sound data stream are each higher than 70% of the average value, it may be a case in which the possibility that the individual is in a dangerous state is high, so that the control unit 150 may immediately transmit situation information to the administrator device 200.

For example, the sixth designated condition corresponds to a case in which the rate of change of the maximum value of the heart rate data stream increases to 70% or more of the average value, the rate of change of the maximum value of the pulse rate data stream increases to 70% or more of the average value, the rate of change of the maximum value of the acceleration data stream increases to 70% or more of the average value, and the rate of change of the maximum value of the sound data stream increases to 70% or more of the average value. In other words, when the rate of change of the maximum value of the electrocardiogram data stream, the rate of change of the maximum value of the pulse rate data stream, the rate of change of the maximum value of the acceleration data stream, and the rate of change of the maximum value of the sound data stream satisfy Equations 3, 4, 5, and 6, respectively, the control unit 150 may transmit situation information, including the location information of the situation information acquisition device 100, a taken surrounding image, and a transcript, to a designated external device (e.g., the administrator device 200).

In other words, when all the rate of change of the maximum value of the heart rate data stream, the rate of change of the maximum value of the pulse rate data stream, the rate of change of the maximum value of the acceleration data stream, and the rate of change of the maximum value of the sound data stream are each higher than 70% of the average value, it may be a case in which the possibility that the individual is in a dangerous state is high, so that the control unit 150 may immediately transmit situation info lotion to the administrator device 200.

Meanwhile, all or only some of the six conditions given as examples of the designated conditions may be set. For example, the fourth to sixth conditions may always be set because the probability that an individual is in a dangerous state is considerably high in those conditions. The first to third conditions may be selectively applied.

In an embodiment, in operation 25, when a designated condition is satisfied, the control unit 150 may transmit situation information, including the location information of the situation information acquisition device 100, a taken surrounding image, and a transcript, to a designated external device (e.g., the administrator device 200). Accordingly, the present invention may analyze a sensor data stream according to Equations 1 to 6, thereby accurately determining whether an individual's state is a dangerous state, rapidly recognizing the individual's dangerous situation, effectively recognizing a conflict situation that occurs in the individual's life, and rapidly securing a data image, a transcript, and location information for each of the dangerous and conflict situations.

According to various embodiments of the present invention, an individual's dangerous state detection-based situation information acquisition device may include: a sensor unit configured to detect an individual's state; a control unit configured to determine that the individual's state is a dangerous state when the rate of change of the maximum value of a sensor data stream detected by the sensor unit satisfies Equation 1 below; a camera configured to photograph the surroundings of the situation information acquisition device from the time when it is determined that the individual's state is a dangerous state; and a voice recorder configured to record sounds generated in the surroundings.

According to various embodiments, the sensor unit may include: an electrocardiogram sensor configured to measure the individual's electrocardiogram signal; a pulse sensor configured to measure the individual's pulses; an acceleration sensor configured to measure acceleration according to the individual's movement; and a sound sensor configured to detect sounds around the situation information acquisition device.

According to various embodiments, the sensor data stream may include an electrocardiogram data stream, a pulse rate data stream, an acceleration data stream, and a sound data stream, and may be represented by Equation 2 above.

According to various embodiments, whenever a surrounding image and a transcript taken according to a preset time or cycle are acquired, the control unit may transmit situation information including the location information of the situation information acquisition device, the surrounding image, and the transcript to a designated administrator device.

According to various embodiments, the control unit may determine whether the rate of change of the maximum value of the electrocardiogram data stream, the rate of change of the maximum value of the pulse rate data stream, the rate of change of the maximum value of the acceleration data stream, and the rate of change of the maximum value of the sound data stream satisfy the following Equations 3, 4, 5, and 6, respectively.

According to various embodiments, when the rate of change of the maximum value of the electrocardiogram data stream satisfies Equation 3 above and the rate of change of the maximum value of the acceleration data stream satisfies Equation 5 above, the control unit may transmit situation information, including the location information of the situation information acquisition device, a taken surrounding image, and a transcript, to a designated administrator device.

According to various embodiments, when the rate of change of the maximum value of the pulse rate data stream satisfies Equation 4 above and the rate of change of the maximum value of the acceleration data stream satisfies Equation 5 above, the control unit may transmit situation information, including the location information of the situation information acquisition device, a taken surrounding image, and a transcript, to a designated administrator device.

According to various embodiments, when the rate of change of the maximum value of the electrocardiogram data stream, the rate of change of the maximum value of the acceleration data stream, and the rate of change of the maximum value of the sound data stream satisfy Equations 3, 5, and 6, respectively, the control unit may transmit situation information, including location info lotion of the situation information acquisition device, a taken surrounding image, and a transcript, to a designated administrator device.

According to various embodiments, when the rate of change of the maximum value of the pulse rate data stream, the rate of change of the maximum value of the acceleration data stream, and the rate of change of the maximum value of the sound data stream satisfy Equations 4, 5, and 6, respectively, the control unit may transmit situation information, including the location information of the situation information acquisition device, a taken surrounding image, and a transcript, to a designated administrator device.

According to various embodiments, when the rate of change of the maximum value of the electrocardiogram data stream, the rate of change of the maximum value of the pulse rate data stream, the rate of change of the maximum value of the acceleration data stream, and the rate of change of the maximum value of the sound data stream satisfy Equations 3, 4, 5, and 6, respectively, the control unit may transmit situation information, including the location information of the situation information acquisition device, a taken surrounding image, and a transcript, to a designated administrator device.

Therefore, the spirit of the present invention should not be limited to the above-described embodiments, and it should be appreciated that not only the claims to be described later but also all equivalents of these claims or all equivalent modifications fall within the scope of the spirit of the present invention.

The invention claimed is:

1. An individual's dangerous state detection-based situation information acquisition device, comprising:

a sensor unit configured to detect an individual's state;

a control unit configured to determine that the individual's state is a dangerous state when a rate of change of a maximum value of a sensor data stream detected by the sensor unit satisfies Equation 1 below;

a camera configured to photograph surroundings of the situation information acquisition device from a point of time when it is determined that the individual's state is a dangerous state; and a voice recorder configured to record sounds generated in the surroundings:

$$\left|\frac{d\mathrm{Max}DS(t)}{dt}\right| > 0.7mDS(t) \tag{1}$$

where DS(t) is the sensor data stream, MaxDS(t) is the maximum value of the sensor data stream, and mDS(t) is an average value of the sensor data stream.

2. The individual's dangerous state detection-based situation information acquisition device of claim 1, wherein the sensor unit comprises:

an electrocardiogram sensor configured to measure the individual's electrocardiogram signal;

a pulse sensor configured to measure the individual's pulses;

an acceleration sensor configured to measure acceleration according to the individual's movement; and a sound sensor configured to detect sounds around the situation information acquisition device.

3. The individual's dangerous state detection-based situation information acquisition device of claim 1, wherein the sensor data stream comprises an electrocardiogram data stream, a pulse rate data stream, an acceleration data stream, and a sound data stream, and is represented by Equation 2 below:

$$DS=\{H_e(t_0), \ldots, H_e(t_n), H_b(t_0), \ldots H_b(t_n), G(t_0), \ldots, G(t_n) S_s(t_0), \ldots S_s(t_n)\} \quad (2)$$

where $H_e(t_n)$ is the electrocardiogram data stream, $H_b(t_n)$ is the pulse rate data stream, $G(t_n)$ is the acceleration data stream, and $S(t_n)$ is the sound data stream.

4. The individual's dangerous state detection-based situation information acquisition device of claim 3, wherein the control unit determines whether a rate of change of a maximum value of the electrocardiogram data stream, a rate of change of a maximum value of the pulse rate data stream, a rate of change of a maximum value of the acceleration data stream, and a rate of change of a maximum value of the sound data stream satisfy the following Equations 3, 4, 5, and 6, respectively:

$$\left|\frac{d\mathrm{Max}H_e(t)}{dt}\right| > 0.7mH_e(t) \quad (3)$$

$$\left|\frac{d\mathrm{Max}H_b(t)}{dt}\right| > 0.7mH_b(t) \quad (4)$$

$$\left|\frac{d\mathrm{Max}G(t)}{dt}\right| > 0.7mG(t) \quad (5)$$

$$\left|\frac{d\mathrm{Max}S_s(t)}{dt}\right| > 0.7mS_s(t) \quad (6)$$

where $H_e(t)$ is the electrocardiogram data stream, $\mathrm{Max}H_e(t)$ is the maximum value of the electrocardiogram data stream, $mH_e(t)$ is an average value of the electrocardiogram data stream, $H_b(t)$ is the pulse rate data stream, $\mathrm{Max}H_b(t)$ is the maximum value of the pulse rate data stream, $mH_b(t)$ is an average value of the pulse rate data stream, G(t) is the acceleration data stream, MaxG(t) is the maximum value of the acceleration data stream, mG(t) is an average value of the acceleration data stream, S(t) is the sound data stream, MaxS(t) is the maximum value of the sound data stream, and mS(t) is an average value of the sound data stream.

5. The individual's dangerous state detection-based situation info lotion acquisition device of claim 4, wherein, when the rate of change of the maximum value of the electrocardiogram data stream satisfies Equation 3 above and the rate of change of the maximum value of the acceleration data stream satisfies Equation 5 above, the control unit transmits situation information, including location information of the situation information acquisition device, a taken surrounding image, and a transcript, to a designated administrator device.

6. The individual's dangerous state detection-based situation information acquisition device of claim 4, wherein, when the rate of change of the maximum value of the pulse rate data stream satisfies Equation 4 above and the rate of change of the maximum value of the acceleration data stream satisfies Equation 5 above, the control unit transmits situation information, including location information of the situation information acquisition device, a taken surrounding image, and a transcript, to a designated administrator device.

7. The individual's dangerous state detection-based situation information acquisition device of claim 4, wherein, when the rate of change of the maximum value of the electrocardiogram data stream, the rate of change of the maximum value of the acceleration data stream, and the rate of change of the maximum value of the sound data stream satisfy Equations 3, 5, and 6, respectively, the control unit transmits situation information, including location information of the situation information acquisition device, a taken surrounding image, and a transcript, to a designated administrator device.

8. The individual's dangerous state detection-based situation information acquisition device of claim 4, wherein, when the rate of change of the maximum value of the pulse rate data stream, the rate of change of the maximum value of the acceleration data stream, and the rate of change of the maximum value of the sound data stream satisfy Equations 4, 5, and 6, respectively, the control unit transmits situation information, including location information of the situation information acquisition device, a taken surrounding image, and a transcript, to a designated administrator device.

9. The individual's dangerous state detection-based situation information acquisition device of claim 4, wherein, when the rate of change of the maximum value of the electrocardiogram data stream, the rate of change of the maximum value of the pulse rate data stream, the rate of change of the maximum value of the acceleration data stream, and the rate of change of the maximum value of the sound data stream satisfy Equations 3, 4, 5, and 6, respectively, the control unit transmits situation information, including location information of the situation information acquisition device, a taken surrounding image, and a transcript, to a designated administrator device.

10. The individual's dangerous state detection-based situation information acquisition device of claim 1, wherein, whenever a surrounding image and a transcript taken according to a preset time or cycle are acquired, the control unit transmits situation information including location information of the situation information acquisition device, the surrounding image, and the transcript to a designated administrator device.

* * * * *